United States Patent
Puvvada et al.

(10) Patent No.: US 11,086,557 B2
(45) Date of Patent: Aug. 10, 2021

(54) CONTINUOUS ASYNCHRONOUS REPLICATION FROM ON-PREMISES STORAGE TO CLOUD OBJECT STORES

(71) Applicant: International Business Machines Corporation, Armonk, NY (US)

(72) Inventors: Venkateswara Rao Puvvada, Inkollu (IN); Karrthik K G, Kodaikanal (IN); Ashish Pandey, Pune (IN); Saket Kumar, Bettiah (IN)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 16/675,300

(22) Filed: Nov. 6, 2019

(65) Prior Publication Data

US 2021/0132811 A1 May 6, 2021

(51) Int. Cl.
*G06F 16/23* (2019.01)
*G06F 3/06* (2006.01)
*G06F 16/27* (2019.01)

(52) U.S. Cl.
CPC .............. *G06F 3/065* (2013.01); *G06F 3/067* (2013.01); *G06F 3/0614* (2013.01); *G06F 16/23* (2019.01); *G06F 16/273* (2019.01)

(58) Field of Classification Search
None
See application file for complete search history.

(56) References Cited

U.S. PATENT DOCUMENTS

| | | | |
|---|---|---|---|
| 8,332,351 B2* | 12/2012 | Leventhal | G06F 16/119 707/610 |
| 9,986,029 B2* | 5/2018 | Avati | G06F 16/184 |
| 10,169,134 B2 | 1/2019 | McBride et al. | |
| 10,229,170 B2* | 3/2019 | Seales | G06F 16/2471 |
| 2010/0274825 A1* | 10/2010 | Nemoto | G06F 3/0647 707/812 |
| 2011/0167045 A1* | 7/2011 | Okamoto | G06F 16/1824 707/661 |
| 2018/0196831 A1 | 7/2018 | Maybee et al. | |
| 2019/0215358 A1* | 7/2019 | Kobayashi | G06F 16/116 |

FOREIGN PATENT DOCUMENTS

| | | |
|---|---|---|
| CN | 107045530 A | 8/2017 |
| EP | 1751745 B1 | 1/2011 |

OTHER PUBLICATIONS

Mell et al., "TheNISTDefinition of Cloud Computing", NIST, U.S. Department of Commerce, Special Publication 800-145, Sep. 2011, 7 pages.

* cited by examiner

*Primary Examiner* — Elias Mamo
(74) *Attorney, Agent, or Firm* — Jared L. Montanaro

(57) ABSTRACT

A system identifies (I) a first independent filesystem that (i) includes a file and (ii) uses file-handles to locate files and (II) a second independent filesystem that (i) operates independently of file-handles, associated with the first independent filesystem, when locating files and (ii) includes a copy of the file. The system generates a file-handle for the copy of the file on an inode of first independent filesystem based on a full-path for the copy of the file on the second independent filesystem. The system replicates one or more data blocks between the first independent filesystem and the second independent filesystem based, at least in part, on the full-path.

20 Claims, 6 Drawing Sheets

CONTINUOUS ASYNCHRONOUS REPLICATION FROM ON-PREMISES STORAGE TO CLOUD OBJECT STORES

BACKGROUND

The present invention relates generally to the field of data management, and more particularly to data caching and disaster recovery.

Cloud computing is the use of computing resources (hardware and software) that are delivered as a service over a network (typically the Internet). Cloud computing entrusts remote services with a user's data, software and computation. Using software as a service, users also rent application software and databases. The cloud providers manage the infrastructure and platforms on which the applications run. End users may access cloud-based applications through a web browser or a light-weight desktop or mobile app while the business software and user data are stored on servers at a remote location.

Cloud services today are taking center stage in providing numerous services like infrastructures, applications, storage, etc. Cloud storage is basically a networked online storage, which can be bought or leased according to storage needs. The entities using the storage cloud are not concerned about how the space is made available to them, but more about whether the guaranteed space is made available or not. Another concern is the privacy of the data and sense of acknowledgement that if the data is stored on such cloud storage, it remains secure. This becomes more important if one copies or replicates critical data or production data to a remote site to meet business continuity requirements. It is also important that the production data be copied to the remote site as quickly as possible while meeting the available bandwidth and cost requirements.

Cloud storage services are becoming more and more common and can be leveraged to copy data to the nearest location during network contention and then copy the data to the remote location over a period of time. Security and privacy are major concerns in the deployments as described above. It may be possible for a person sitting at one of the cloud storage sites to get a peer view on production or primary data that might contain confidential or personal information.

SUMMARY

One aspect of the invention provides a computer implemented method. The method comprising: identifying, by at least one computer processor, (I) a first independent filesystem that (i) includes a file and (ii) uses file-handles to locate files and (II) a second independent filesystem that (i) operates independently of file-handles, associated with the first independent filesystem, when locating files and (ii) includes a copy of the file; generating a file-handle for the copy of the file on an index node of first independent filesystem based on a full-path for the copy of the file on the second independent filesystem; and replicating one or more data blocks between the first independent filesystem and the second independent filesystem based, at least in part, on the full-path.

Another aspect of the invention provides a computer program product embodied as program instructions stored on a computer readable storage medium. The program instructions comprising instructions to cause a computing device to perform a method, the method comprising: identifying, by at least one computer processor, (I) a first independent filesystem that (i) includes a file and (ii) uses file-handles to locate files and (II) a second independent filesystem that (i) operates independently of file-handles, associated with the first independent filesystem, when locating files and (ii) includes a copy of the file; generating a file-handle for the copy of the file on an index node of first independent filesystem based on a full-path for the copy of the file on the second independent filesystem; and replicating one or more data blocks between the first independent filesystem and the second independent filesystem based, at least in part, on the full-path.

Another aspect of the invention provides a computer system. The computer system including program instructions stored on a computer readable storage medium that, when executed by the computer system, causes the computer system to perform a method, the method comprising: identifying, by at least one computer processor, (I) a first independent filesystem that (i) includes a file and (ii) uses file-handles to locate files and (II) a second independent filesystem that (i) operates independently of file-handles, associated with the first independent filesystem, when locating files and (ii) includes a copy of the file; generating a file-handle for the copy of the file on an index node of first independent filesystem based on a full-path for the copy of the file on the second independent filesystem; and replicating one or more data blocks between the first independent filesystem and the second independent filesystem based, at least in part, on the full-path.

Still yet, any of the components of the present invention could be deployed, managed, serviced, etc., by a service provider who offers to implement data management in a computer system. Embodiments of the present invention also provide and encompass related systems, methods, and/ or program products.

BRIEF DESCRIPTION OF THE DRAWINGS

These and other features of this invention will be more readily understood from the following detailed description of the various aspects of the invention taken in conjunction with the accompanying drawings.

DETAILED DESCRIPTION

Figure 1:
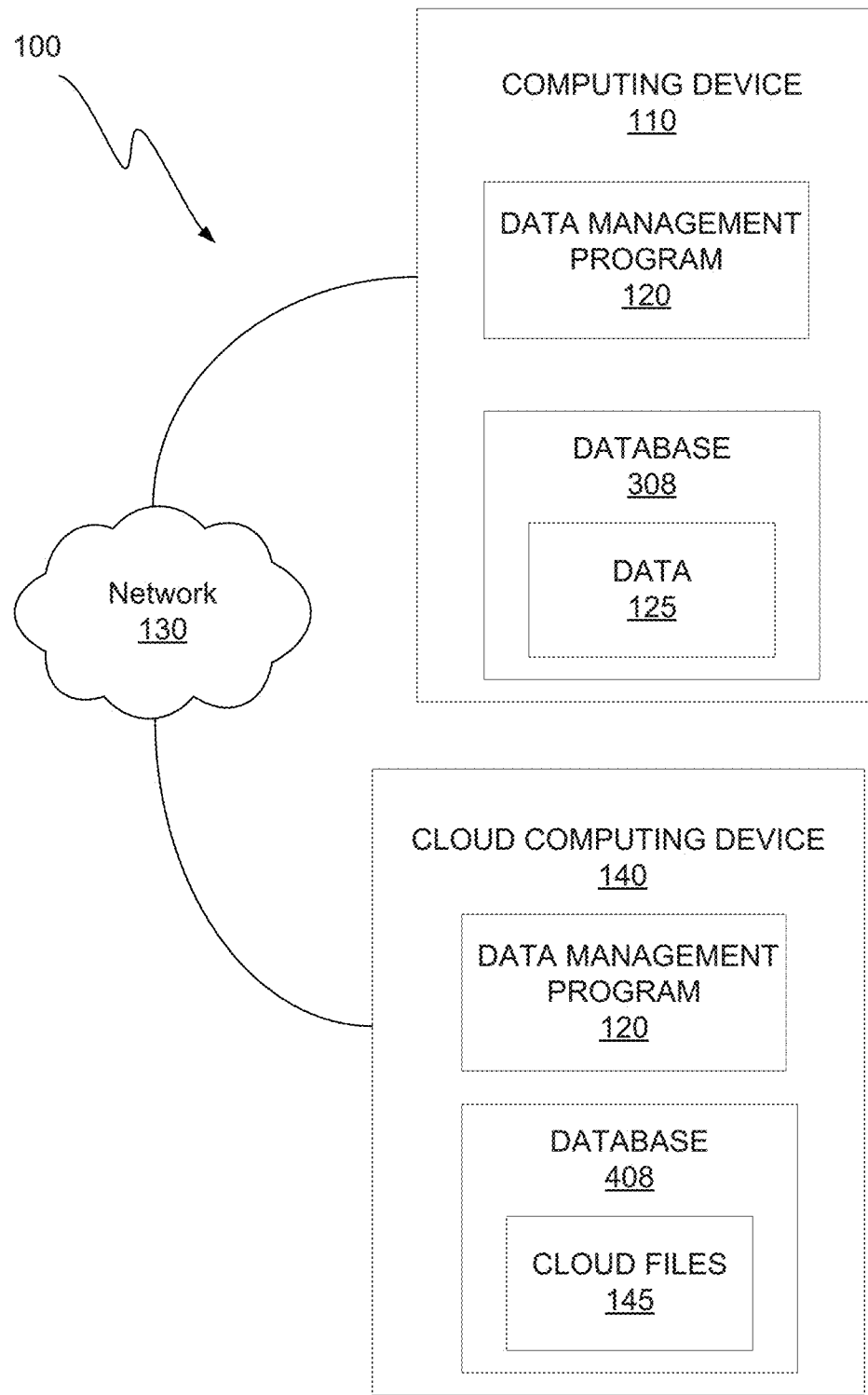
FIG. 1 is a functional block diagram illustrating a data management environment, in accordance with an exemplary embodiment of the present invention.

Detailed embodiments of the present invention are disclosed herein with reference to the accompanying drawings. In the drawings, like numbering represents like elements. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention recognize that most on-premises storage solutions offer a policy based, periodic, complete migration of data from the on-premises storage to the cloud storage. Embodiments of the present invention provide a performance improvement of a distributed computing system by providing the ability to replicate data, as and when its generated, to the cloud storage as a backup or disaster recovery solution.

An index node (inode) is a data structure in a Unix-style file system that describes a file-system object such as a file or a directory. Each inode stores the attributes and disk block location(s) of the object's data. File-system object attributes may include metadata (times of last change, access, and/or modification), as well as owner and permission data.

Embodiments provide an approach for replication to a remote filesystem site, which cannot generate a reliable file-handle (or remote inode number), by writing/modifying objects using their complete name from the root of the filesystem/file-set. How complete names of such objects are generated is discussed in further detail herein below.

Embodiments recognize that by being able to replicate to a cloud object store, the scope of replication is extended to any generic backend. Embodiments provide data movement between two or more independent filesystems, leverages inodes like information on disks. Embodiments provide for the storage of a path of (i) a file on a remote filesystem in (ii) a local filesystem inode itself. As such, embodiments recognize and provide solutions in which there is no requirement for (i) hashing and (ii) maintenance of a directory of hierarchy information in a metadata file and it traverses metadata file when an object is accessed and implementing in-memory hash table for files/directory paths, which are very time consuming tasks.

Embodiments recognize and provide a solution in which a filesystem is not accessed by applications. Instead, embodiments recognize and provide a solution in which the filesystem is accessed by an active file management system in Linux kernel to move data to a remote object filesystem for caching/disaster recovery (DR). Embodiments recognize the differences between data of remote objects and data of applications.

Embodiments provide a way to optimize resources and performance improvements for file/directory access by caching file/directory information in memory (RAM) like Linux kernel.

Embodiments provide seamless backup to/from an object storage filesystem to/from an on-premises Portable Operating System Interface (POSIX) compliant filesystem. Here there are two filesystems involved: (i) one of them an on-cloud system with no way of generating file-handles and (ii) the other is an on-premises traditional filesystem (e.g., POSIX compliant). Embodiments sort out the differences in the traditional on-premises filesystems and new generation on-cloud filesystems thereby bridging the gap in replicating between these systems. Embodiments recognize that such a solution may be on par with existing replication/backup between two POSIX compliant systems that an active file management system can already address.

Embodiments provide a replication/caching/backup/disaster recovery solution between two or more filesystems. In one such embodiment, these filesystems include at least one filesystem that is located on-premises and another filesystem that is remote-accessible by the on-premises filesystem and is a workload supporting filesystem, i.e., a cloud object store filesystem. Embodiments provide seamless replication of data/metadata between the filesystems, in an asynchronous fashion, to service customer needs (e.g., for backup for disaster or providing a subset of the data at an edge location to provide the customer with a lower latency access of the data), which is measured relative to the locations of the two or more filesystems. On other words, embodiments can provide movement of data/files such that a lower access latency is achieved when compared to the latency associated with a previous location of the data/file.

Embodiments can be extended to replication between two cloud sites as well. In some embodiments and scenarios, this replication provides movement of a subset of data closer to a set of users that are determined to be or are predicted to be interested in the data. In some embodiments, this movement may include one or both of (i) a replication of a given data/file and (ii) a migration of a data/file from one location to another.

Some embodiments provide aspects other than just the replication of data/files using an object path. Some embodiments also provide: (I) Complete data/metadata replication to/from the on-premises filesystem to the cloud. Since the remote site here is an object store, different aspects of the object store are stored on the on-premises counterpart of the entity, note that this is not limited to just file-handle caching to memory and referring them using the object path. (II) Edge caching of objects of interest, i.e., creation of a copy of a given data/file at a location that has lower latency relative to the source of the data/file that is used to create the copy. For example, assume that there is a cloud store of all the data in the world. As such, an embodiment creates a subset of all that data at an edge cache that is logically closer and/or has lower latency relative to a user that is determined to be interested in the subset of the data. (III) On-demand push/pull of data. In one embodiment, an on-premises location pulls data of interest (or vice versa, wherein a cloud computing system pulls data of interest from an on-premises system) on demand. In one such embodiment, read requests are captured from applications, then a determination is made as to whether the object of interest is present at the edge cache already. If the object of interest is not present at the edge cache already, some embodiments execute a fetch of that object from a remote site (the cloud in this case). (IV) Store the object paths from remote site on the on-premises site's object counterpart's extended Attributes in order to easily identify the counterpart at remote site later when required. (V) Fetching of a whole subset of objects from the cloud to a given premises that is outside of an on-demand model that includes the cloud. In one such embodiment, a set of objects is provided that are determined/predicted to be needed/present on a given premises before a trigger time. In one such embodiment, the objects in the list are fetched from the cloud and moved to or copies of those objects are created on the on-premises location. In some embodiments, the user is therefore provided access to the data at the mentioned location at a time when the user is determined to need access to that data.

Some embodiments provide a replication/caching model that is extended to the cloud and can include/leverage: (I) A collection of changes to a set of objects (e.g., for a predefined interval of time dictated by delay associated with an asynchronous replication of data) such that the amount of back and forth calls between an on-premises system and the cloud is reduced/minimized (also the actual amount of data transfer required can be minimized in case the object is decided to be removed before the object data can be pushed to the cloud). In some embodiments and scenarios, this minimizes data movement between the sites, which directly works out to a reduction in a cost for moving such data. (II) On-demand pull of objects from cloud to on-premises: A fresh on-premises file-set/filesystem can be created pointing to an existing cloud system consisting of consolidated data there is already. Now when user tries to access objects on the data from an on-premises location, the data can be pulled, on demand, from the cloud and kept at the on-premises location, as needed. In one embodiment and scenario, the first-time access of such un-cached data incurs the bulk of the network latency as measured between the on-premises location and cloud systems. Thereafter, the object can be cached to the on-premises location and served to the users locally. (III) Prefetch of objects: Not only is the pull on demand, some embodiments provide a solution in which a user can consolidate a list of objects required to be at on-premises locations (e.g., before the time such data might be required at an on-premises location)—and the pull of all the objects in the list is executed from an on-premises location and the pulled data is stored before that data might be needed for the users. (IV) Eviction at the on-premises location: Assume a scenario in which an on-premises location, where data is generated, has a data storage that is full (e.g., is filled to a threshold), and additional storage space/room needed to store new data. As such, in such a scenario, some embodiments provide eviction of data at will, e.g., using pre-determined policies such as cache algorithms such as a least recently used (LRU) page replacement algorithm. However, in some embodiments, the user is provided with an option to write any policy of their own, which can be based on any object attribute.

Further, in some embodiments, one underlying assumption is that the data has already been replicated back to the cloud store asynchronously. As such, when the data is again needed at an on-premises location, some embodiments pull that data and serve it to the user that is determined to need it. In some embodiments, such eviction from an on-premises site is quota based where system administrators, or other users, can set quotas per user/file-set/filesystem, and when such limits are reached, the eviction process is activated to remove certain data to make space for new data generated by the user/file-set/filesystem. (V) Push all data to new cloud-based storage site as required: In some embodiments, all the local objects on premises storage can, on command, be pushed to a new cloud storage location as required, thereby establishing a new relationship altogether or replacing another cloud site, such as an older cloud site that is due for replacement. (VI) Failover to cloud and failback to on-premises location as required: Consider a scenario in which the production site of customer is an on-premises location and data is being pushed to one or more cloud-based storage sites for storage/disaster recovery purposes. If the on-premises production site fails, embodiments enable the customer to be able to failover to the cloud site, thereby enabling the user to run applications with available data via copies of the data that are included in the cloud-based storage sites. Further, a similar scenario may occur when the production site should come back on-line following fail-over, i.e., following disaster recovery. In such a scenario, the user, with a few steps, can restore the original production cluster and catch up all data changes that were made at the cloud DR site in its absence thereby fulfilling one complete DR cycle.

Some embodiments provide verification of whether a size of the file handle, including a remote inode number, is sufficient to store a given object name or not. Some embodiments provide storing the complete object name in the file handle place along with a parent inode number, if the file handle size is sufficient. Some embodiments provide that, if the object name is greater the file handle size, then the complete path of objects is retrieved from the root of the filesystem from the stored fold-Values, e.g., reference values.

Some embodiments provide identification of a given object included in a cloud-based storage site with respect to its on-premises counterpart by means of storing a reference in the form of a file-handle replacement, e.g., like the path of the complete object at the cloud store. Some embodiments provide a way to identify a given object on a cloud-based storage site either by (i) seeing if the complete paths fits in the given slot on the inode or (ii) by storing a reference fold value of the local inode, such that it can be used to frame the complete path of the remote object from its local counterpart. This some embodiments can reference the remote object and write to/read from the remote object.

Some embodiments leverage such file-handle replacement, which can make it easier for follow up operations on a given object from the on-premises location to the cloud. Some embodiments provide optimized storage of file-handle replacements. Some embodiments provide an approach for execution of follow-up operations to existing objects over the network to the remote cloud storage. Some embodiments provide storing and retrieving alternatives of a file-handle for easier identification of remote objects on which follow up operations can be performed more easily when compared to certain other remote objects.

Some embodiments provide identification of unique objects on the cloud object store, e.g., like storing a file-handle equivalent in the inode structure on the traditional filesystem. Also, some embodiments provide and leverage an approach that governs how to handle a scenario in which there is limited space availability in a given inode. Accordingly, certain embodiments leverage a fold-Value to identify the local object can be stored as a replacement on the inode such that it is easier to replicate back to the cloud storage. Some embodiments provide a system that has no hard restriction that requires that the underlying filesystem on the remote, i.e., the cloud, site should be the same as the local traditional filesystem that is available. Instead, some embodiments provide a system that is able to replicate to any cloud object store as is, e.g., through a filesystem that it exposes for the underlying cloud infrastructure, such as a FUSE compatible POSIX and the like.

Some embodiments provide follow up operations or modifications on the object by sending a change for the object (i.e., a delta) or partial file to the cloud to control the amount of data recalled from the cloud site to on-premise site, and keeps a track of cost of data recall/movement between the cloud storage and on-premise site, wherein only the needed data is recalled in contrast to recalling complete objects, which has a cost, i.e., consumes more resources when compared to only recalling the needed data.

Some embodiments provide capture of live on-premises changes being made to objects, transferring only those changes to the cloud, thereby reducing an extra cost that is otherwise incurred to identify the delta/the change that has been made to the object. Furthermore, some embodiments provide features to efficiently call-back data from the cloud in a data efficient way. In contrast, prior solutions recall the portion of data that is only needed at an on-premises site at that point. Additionally, some prior solutions not only send delta of objects to the cloud object store but also send the entire object to the cloud to replace the existing version of the object that is stored there, which can be pre-determined and includes sending existing static data as well as the change. It should be noted that there is a cost that is incurred in splitting the file into multiple chunks during transfer and another cost that is incurred while assembling the objects using the multiple chunks. As such, even if a given object is split into chunks, the sending of all those chunks, which are later re-assembled at the cloud storage site, still incurs a cost that is greater than just sending only the delta for such objects.

Some embodiments provide (i) transmission of the delta of objects, which are generated on-premises, to the cloud and (ii) recalling of objects from the cloud in such a way that the least cost is incurred when retrieving the remote object and storing the remote object on the local on-premise storage.

Some embodiments provide pulling back data from the cloud to the on-premises system.

Some embodiments provide an approach that dictates one or both of (I) how follow up operations are performed on the same inode under consideration and (II) how data shall be pulled back, in an efficient way, from the cloud object store to the traditional filesystem, from which it was migrated out of.

Some embodiments provide control of the asynchronous delay parameters set (active file management (AFM)) for an amount of time that is required to change data and held on the queue before migrating object to the cloud and ensuring that there are always enough data blocks (sometimes even the complete file) to be replicated/migrated back to the cloud.

Some embodiments provide a way of controlled replication back to the cloud such that (i) multiple requests are combined into a single chunk of operation that is sent to the cloud, and (ii) replicating objects at per-determined intervals such that chunks of operations are reflected in the replicated versions of the objects. Some embodiments provide a specific (tunable) delay parameter, which delays the replication in such a manner that there is enough operations accumulated on the given object such that there is a bulk of operations to be transferred to the cloud in one blast. Such a delayed replication can also ensure that operations are not, unnecessarily, sent to/processed by the cloud, only to have it later be determined that those operations need to be discarded/removed/rolled-back. For example, consider an application performing a case like Create-Chmod-Chown-Write-Truncate-Remove all on the file in an interval of five minutes. Now, without having the asynchronous delayed replication, this would mean replicating the data to the cloud and later removing it would incur additional data transmission cost. However, in various embodiments, and in contrast, the proposed delayed replication, as leveraged herein, helps ensure that only necessary data/changes are transferred to the cloud.

Some embodiments provide a parameter that can control and throttle the speed and need of replication at any given point. In some such embodiments, there is an enforced delay that allows for an accumulation of an ample amount of data that can be transferred to or pulled back from the cloud location. In contrast, certain other solutions simply transfer on a track by track basis as/when changes are received, which incurs additional data transmission cost.

Also, some embodiments provide reduction in unnecessary playback to the cloud by means of filtering logic that is built in, which removes certain irrelevant operations from a queue of operations that needs to be played back to the cloud, or that need pull back from the cloud.

Some embodiments provide a method to filter out unnecessary operations in the local filesystem itself before considering to be played to the remote Filesystem. For example, a tunable parameter like the asynchronous delay ensures that there is at least a bare minimum data level present before it can be replicated back to the cloud store. Further, the tunable feature ensures that certain sequences, where the file/object gets removed at the end, can be completely filtered out from a local queue before changes/and/or the file/object are transferred to the cloud store.

Some embodiments provide maintenance of a queue of operations, that are awaiting transfer from an on-premises filesystem to the cloud store, which can be manipulated and processed in an asynchronous manner.

Some embodiments provide utilization of a cascading model of active file management (AFM) caching models which includes, hierarchy of storage sites and at each level of storage site. In some such embodiments, a user can configure one or both of (i) the type of data to be maintained in a database and (ii) the type of data to be evicted out the database, which can improve flexibility when forming a consolidated data store.

Some embodiments provide a way to cascade data, from an on-premises location, across multiple cloud sites that are setup in a cascading model, such that (i) only relevant data is kept in certain cloud sites and (ii) the rest of that data is moved down through the cascading model to the other cloud sites that are further down in the cascade.

Some embodiments provide a way to store the objects of interest to particular users/geography at the particular cloud site and cascade the remaining down in the cascade model. Also, some embodiments provide a consolidation of all the data at one of the cloud sites.

Some embodiments provide cascading levels of replication to enable keeping data of interest closer to the users who are predicted to want access to a subset of data they have indicated that they have an interested in. For example, a user frequently accesses a type of data and the cloud storage includes several portions of that type of data. As such, the system predicts that the user is likely to want low-latency access to those several portions of that type of data and therefor migrates and/or creates copies of the several portions of that type of data at a location that is closer to the user, e.g., at an on-premises site or an edge cache/an edge location that provides the user with a lower latency access to the data.

Some embodiments provide a cascading model of storage clusters or sites, wherein the cascading model can be seen as a whole namespace at all the locations. However, in some scenarios and embodiments, only some of the locations contain various portions of the relevant data, which is specific to the location of such a site, and other remaining portions of the data are released to the other locations down or up in the chain in this cascade. As such, embodiments leverage this cascading model to provide a way to keep relevant data close to the users in particular locations and provide a wholesome namespace view of all the data to relevant users, which triggers pullback of data as required when users try to read/write to it. Some embodiments provide and leverage an on-demand approach that ensures that the required data is available at the given location at given time.

Some embodiments provide a cascading model, where data of interest to a specific user or a specific geography can be kept at the particular (cloud) location and any data that is irrelevant can be migrated to a different (cloud) location down the cascading model. This way, some embodiments provide (i) a consistent namespace across all the cloud locations, but the actual data/objects are only present in those locations that prefer to keep the data, and (ii) at other locations, there is just the stub of such data/objects such that the user/systems there are aware of its presence, but can still avail such data/objects on-demand, while incurring the latency cost to pull data from one cloud to the other, which is a price for accessing such stub data/objects.

Some embodiments recognize and/or provide one or more of the following: Expanding the scope of data backup from on-premises to include cloud options, which may be leveraged to migrate all files from on-premises locations to cloud as a backup or disaster recovery solution. Certain cloud migration use-cases focus on a demand-based policy run to generate the list of files that need to be migrated to the cloud, which is typically time consuming when all files need to be migrated. In contrast, some embodiments eliminate such bursts of input/output (I/O) to the cloud when all files need to be migrated.

In some such embodiments, data is backed up to the cloud as/when it is generated on-premises. In some scenarios and embodiments, if an object being modified, then an option is provided that enables sending of just the delta of that object to the cloud, as compared to whole objects. Embodiments recognize that certain cloud migration solutions leverage removal of data blocks from on-premises locations such that only the copy in the cloud-based storage exists. It is recognized that, in such cloud migration solutions, that a recall of the data blocks is needed when a change is made to the data blocks on-premises.

Some embodiments provide and leverage a model that reduces/eliminates the need for evicting local data blocks in response to a migration of the local data blocks to cloud-based storage. Some embodiments provide and leverage a solution that retains such data blocks, regardless of whether or not they are migrated, until a determination is made that indicates that those data blocks are no longer needed at the on-premises site and the local filesystem can later evict those data blocks based on policies, which state the LRU nature of the objects and call for removal of those data blocks from the local storage. In some such embodiments, data blocks can be evicted at will from the on-premises location on LRU basis or other such file listing basis, which make space for newer data getting generated on-prem. Embodiments recognize that, by leveraging partial file caching features in the replication solutions (AFM), it may be comparatively easier to control how much data being recalled from the cloud site to the on-premises location, thereby keeping the cost of data recall/movement between the cloud storage and on-premises location in check.

In some embodiments and scenarios, only the data that is needed is recalled in such models, as opposed to recalling complete objects. In some embodiments and scenarios, use of an asynchronous delay parameters set (AFM), which includes value that control how long the data change needs to be held on the queue before being migrated to the cloud, ensures that there is typically enough data blocks (sometimes even the complete file) to be replicated/migrated back to the cloud. In some embodiments and scenarios, with a cascading model of AFM caching models that includes hierarchies of storage sites, the user can configure what kind of data needs to be maintained and what needs to be evicted out at each level of storage of a given site. In some embodiments and scenarios, such configuration provides a flexible edge storage technique that leverages knowledge of which data is of interest, for particular set of users, exists close to/or as part of a local computing system of those users. In some embodiments and scenarios, by coupling replication to the cloud storage, at the end point of replication, a more flexible solution to formation of a consolidated data store is provided, while also maintaining data of interest close to each user in a local manner. In some embodiments, the cloud filesystems can support delta migration for an existing object, as compared to complete object migration that some solutions support.

The present invention will now be described in detail with reference to the Figures.

FIG. 1 is a functional block diagram illustrating a data management environment, generally designated 100, in accordance with one embodiment of the present invention. Data management environment 100 includes computing device 110 connected over network 130. Computing device 110 includes data management program 120 and data 125. Cloud computing device 140 also includes data management program 120 as well as database 408, which includes cloud files 145. In general, data management program 120 includes program instructions that, when executed by computing device 110 and cloud computing device 140, or another computing device included in data management environment 100, cause the computing device(s) to follow a method depicted in FIGS. 2 and 4 and as described herein.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to data management program 120 and data 125 and is capable of executing data management program 120. Computing device 110 may include internal and external hardware components, as depicted and described in further detail with respect to FIG. 3.

In this exemplary embodiment, data management program 120 and data 125 are stored on computing device 110. However, in other embodiments, data management program 120 and data 125 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110 and data management program 120 and data 125, in accordance with a desired embodiment of the present invention.

In exemplary embodiments, the proposed solution looks to replicate to a remote filesystem site which cannot generate a reliable file-handle (or remote inode number)—by writing/modifying objects using their complete name from the root of the filesystem/file-set. Note that how the complete names of objects are generated and included in file-handles is discussed in detail herein below. By being able to replicate to a cloud object store, we are expanding the scope of replication to any generic backend here as compared to other systems that require specific backends.

The existing replication solutions hook into the Filesystem's VFS layer—and capture all the operations that are being performed on the local Filesystem, which can be replicated to the remote site filesystem in an asynchronous manner.

Embodiments recognize that a replication solution needs the ability to identify the whole path of a file that is being written to/read from, instead of trying to reach it through just the remote inode number. As such, alternative pathways to reach objects are stored in the Extended Attribute (EA) set of the on-premises objects and are used for identifying individual objects at the cloud site.

Embodiments provide a replication solution that holds a remote file-handle of an object's counterpart, through which the object can be identified, and I/O performed. However, since the file-handles are not consistent for certain remote sites to which replication is occurring, e.g., a cloud filesystem, embodiments leverage the following:

(1) The typical file-handle size allocated to store today are 64 bits in size, e.g., a filesystem identifier (FSID) is a 64-bit number. In general, an FSID is a reference to an Advanced Encryption Standard (AES) encryption key. The algorithm described by AES is a symmetric-key algorithm, meaning the same key is used for both encrypting and decrypting the data. Unlike disk encryption where no key is specified, a reference to a key is needed in order for multiple clients, e.g., multiple NFS client case, to refer to the same key. So, if the object's name is less than or equal to this—we can only store this name of the object in its file-handle place. Along with the parent inode number of the object—so that we can easily frame the complete path of the object from the root of the Filesystem/file-set.

(2) In case the file-path from the root of the FS is bigger than these 64 bits mentioned, then we need to retrieve the path of these objects from the root of the file-set/filesystem from their stored fold-Values. Distributed filesystems store what is called a fold-Value—from which it is easier to derive the complete path and other attributes of a given object. fold-Values are reference values stored by the filesystem.

Once the replication system has the complete object's path from either of the above methods, it is, in general, able to replicate data blocks over to the cloud storage system. A typical sequence in replication solution may be: (1) Create a copy of a file, which is on a production site, on a remote (DR) site. Receive remote file-handle from the remote site and store on the production site file's inode. This file-handle is generated by the remote filesystem for all files/directories that are created—which is unique to the entity because it is generated based on the inode number, the generation number and the FSID of the exports. (2) Later when any other operation comes up on the file—retrieve the file-handle of the file. Using the file-handle on remote backends like NFS will be easy to perform.

The file-handles will be used for any operation performed on the file later.

A file-handle is a number that an operating system assigns temporarily to a file when it is opened. The operating system uses the file-handle internally when accessing the file. A special area of main memory is reserved for file handles, and the size of this area often determines how many files can be open at once.

With the need to replicate continuously to cloud based filesystems which don't have the mechanism to generate constant file-handles (using which we can uniquely identify the objects on cloud), we need to alter the above logic like follows: (1) Create object from on-premises locations to the cloud site. Store the full-path of this object from the Filesystem root, on the file's file-handle space. If larger than the file-handle slot, then retrieve the object's fold-Value from which the full-path of the object can be derived. (2) When follow up operations are performed on this object, we need to perform full-path based IO on its remote counterpart object as compared to file-handle based IO that was being done so far in any case of async replication to such remote sites.

The POSIX like interface exposed by such cloud filesystems today, handles an update operation of an object as follows: (1) Retrieve the complete object from the cloud to on-prem. (2) Make local in-place changes on the object. (3) Upload the complete object back to the cloud.

This might be applicable to cases where the on-premises storage doesn't know where the object exists or, if it is a bulk migration, then there is no need to maintain the difference alone. But with the ability of replication systems to identify just the delta that is being changed on the local filesystem seen above, there arises the necessity of cloud Filesystems to support in-place updates of objects so that the end-users can get data migrated more seamlessly and in a faster manner.

One way to do this would be to maintain a threshold of how much data needs to get modified (Percentage of data modified)—on each object before it can be migrated back to the cloud site (as a complete object) as supported by most cloud object stores today. While it might not be much of an enhancement—it would at least make sure that enough data is getting accumulated before even attempting the migration from the prem to cloud site again.

A path, the general form of the name of a file or directory, specifies a unique location in a file system. A path points to a file system location by following the directory tree hierarchy expressed in a string of characters in which path components, separated by a delimiting character, represent each directory. The delimiting character is most commonly the slash ("/"), the backslash character ("\"), or colon (":"), though some operating systems may use a different delimiter. Paths are used extensively in computer science to represent the directory/file relationships common in modern operating systems and are leveraged in the construction of Uniform Resource Locators (URLs). Resources can be represented by either absolute or relative paths. An absolute path or a full path will point to the same location in a file system, regardless of the current working directory. To do that, it must include the root directory. By contrast, a relative path starts from some given working directory, avoiding the need to provide the full absolute path. A filename can be considered as a relative path based at the current working directory. If the working directory is not the file's parent directory, a file not found error can result if the file is addressed by its name. For a POSIX pathname, POSIX allows treating a path beginning with two slashes in an implementation-defined manner, though in other cases systems must treat multiple slashes as single slashes.

Figure 2:
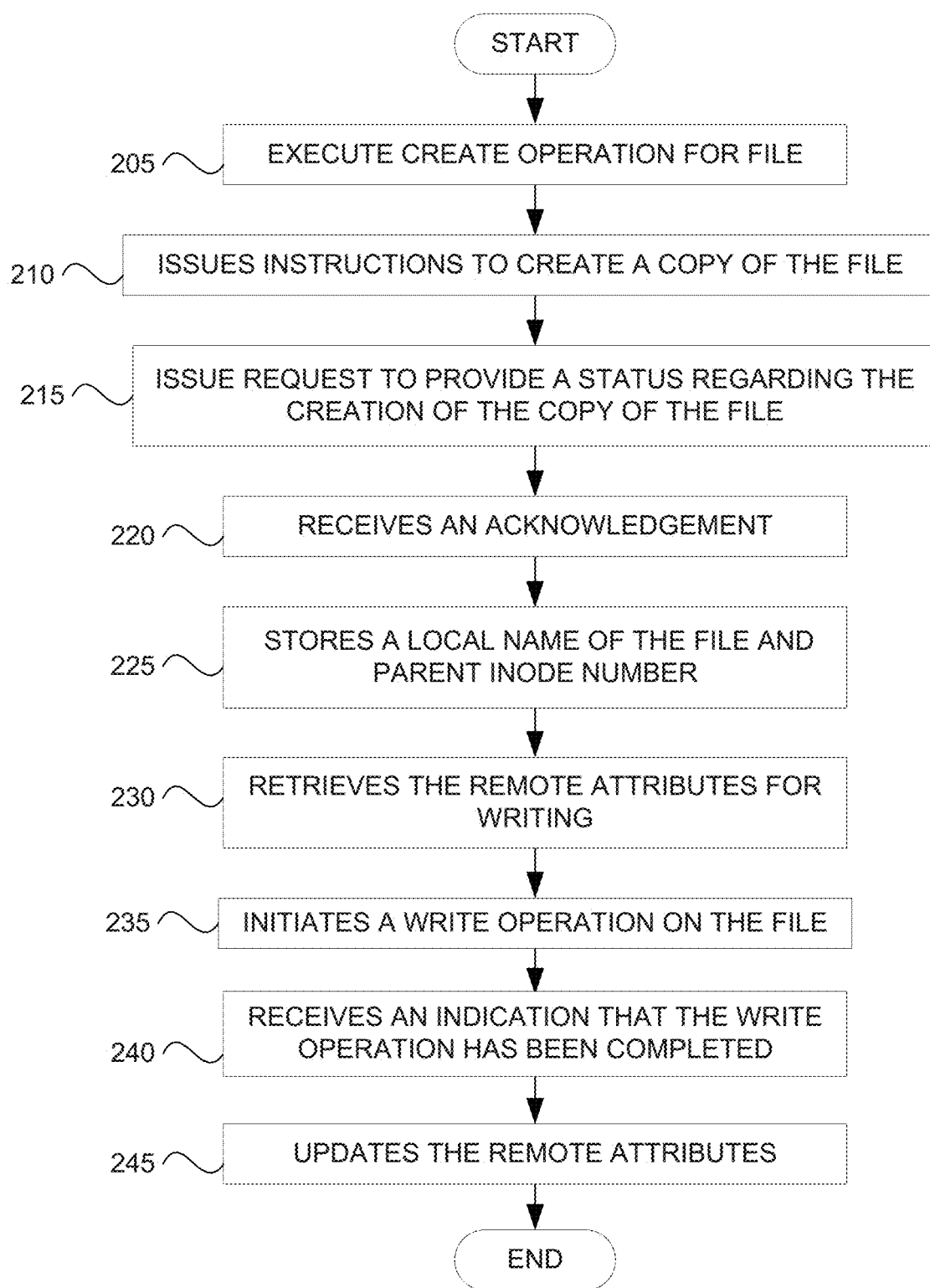
FIG. 2 illustrates a flow diagram illustrating operational processes of data management program executing on a computing device within the environment of FIG. 1, in accordance with an exemplary embodiment of the present invention.

FIG. 2 illustrates a flow diagram illustrating operational processes of data management program executing on computing device 110 within the environment of FIG. 1, in accordance with an exemplary embodiment of the present invention. While only select aspects of data management program 120 are highlighted by FIG. 2, it is to be understood that other functions/processes of data management program 120, which may be carried out on cloud computing device 140, are described with respect to FIG. 4.

In process 205, data management program 120 performs a create operation for a file, e.g., a test file in data 125, on computing device 110.

In process 210, data management program 120 issues instructions to create a copy of the file in cloud files 145 on cloud computing device 140.

In process 215, data management program 120 sends an instruction to cloud computing device 140 that includes a request for cloud computing device 140 to provide a status regarding the creation of the copy of the file. In other words, computing device 110 queries cloud computing device 140 to determine whether or not the copy of the file has been created.

In process 220, data management program 120 receives an acknowledgement from cloud computing device 140 that indicates that the copy of the file has been created.

In process 225, data management program 120 stores a local name of the copy of the file and parent inode number for the file. In some scenarios and embodiments, if the local name is greater than sixty-four bits in length, then a foldvalue of the file is stored in place of the local name. In some scenarios and embodiments, data management program 120 stores remote attributes associated with the file including, but is not limited to, filehandle, remote inode mtime, and ctime. In general, data management program 120 creates and stores an extended attribute file for the inode in a database.

In process 230, data management program 120 retrieves the remote attributes for writing.

In process 235, data management program 120 initiates a write operation on the file using the file handle.

In process 240, data management program 120 receives an indication that the write operation has been completed on cloud computing device 140.

In process 245, data management program 120 updates the remote attributes included in the extended attributes for the inode. In general, the copy of an object is included in a cloud filesystem (not shown) that is stored in database 408 and that copy of the object can be used to rebuild the version included in persistent storage 308 in the event that persistent storage 308 suffers a fail-over event. In the event of a fail-over, in some embodiments, a copy of a file included in database 408 is used to serve requests for that file until persistent storage 308 is rebuilt.

Figure 4:
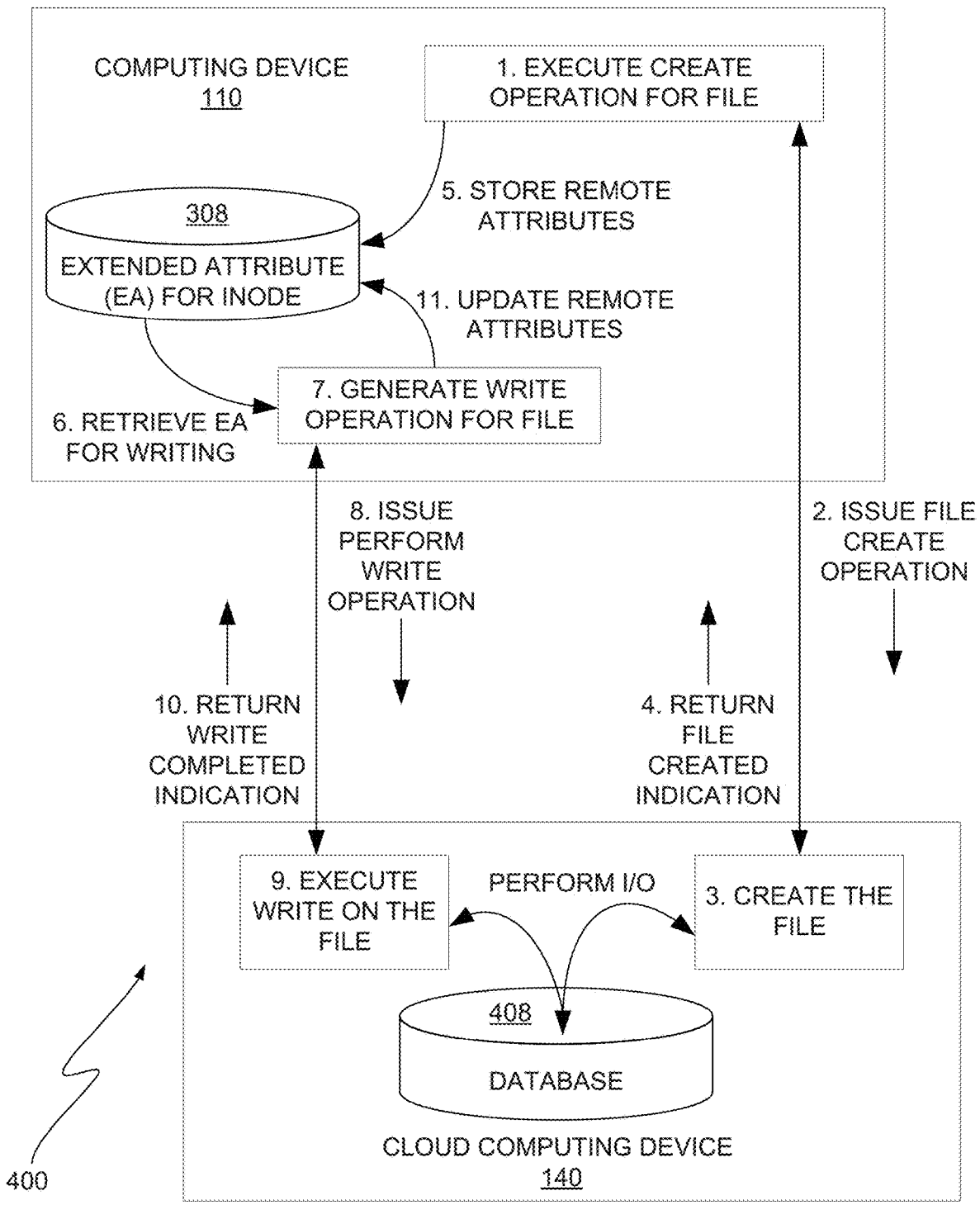
FIG. 4 illustrates a functional block diagram illustrating operational processes of a data management system following the environment of FIG. 1, in accordance with an exemplary embodiment of the present invention.

In one embodiment, the processes 205-245, with further reference to FIG. 4, include and depict processes in which data management program 120: identifies (I) a first independent filesystem that (i) includes a file and (ii) leverages file-handles to locate files and (II) a second independent filesystem that (i) operates independently of file-handles when locating files and (ii) includes a copy of the file; generating a file-handle for the copy of the file on an inode of first independent filesystem based on a full-path for the copy of the file on the second independent filesystem; and replicating one or more data blocks between the first independent filesystem and the second independent filesystem based, at least in part, on the full-path. It is to be understood that, in the depicted embodiments, the first independent file system and the second independent file system are on separate devices that communicate over a network. However, not all embodiments are limited thereto provided one filesystem leverages file-handles to locate files and the other filesystem does not.

In one embodiment, processes 205-245, with further reference to FIG. 4, include and depict processes in which data management program 120: determines that a request has been made for the creation of the copy of the file on the second independent filesystem; and responds to a determination that the copy of the file was created on the second independent filesystem, generating the full-path for the copy of the file based, at least in part, on a set of characteristics of the second independent filesystem.

In one embodiment, processes 205-245, with further reference to FIG. 4, include and depict processes in which data management program 120: stores the full-path for the copy of the file as part of a space of the file-handle, wherein the full-path for the copy of the file is determined based on a Filesystem root of the second independent filesystem.

In one embodiment, processes 205-245, with further reference to FIG. 4, include and depict processes in which the second independent filesystem generates a set of file-handles for one or both of files and directories, and wherein file-handles included in the set of file-handles are unique and are generated based on an inode number, a generation number, and a filesystem identifier (FSID) of the exports.

In one embodiment, processes 205-245, with further reference to FIG. 4, include and depict processes in which data management program 120: determines that an operation on the file has been requested; executes the operation on the file; retrieves the file-handle for the copy of the file; and executes the operation on the copy of the file based on the file-handle for the copy of the file.

In one embodiment, processes 205-245, with further reference to FIG. 4, include and depict processes in which data management program 120: generates the full-path for the copy of the file based on a root of a file-set of the second independent filesystem; and associates the full-path with the copy of the file.

In one embodiment, processes 205-245, with further reference to FIG. 4, include and depict processes in which data management program 120: replicates the one or more data blocks between the first independent filesystem and the second independent filesystem by either creating or modifying a data object based, at least in part, on a complete name for the data object that is included in the root of a respective filesystem.

In one embodiment, processes 205-245, with further reference to FIG. 4, include and depict processes in which data management program 120: determines a number of bits needed to store a name associated with the copy of the file; and responds to a determination that the number of bits is less than or equal to a number of bits of the file-handle by populating the name in the file-handle based on the name associated with the copy of the file.

In one embodiment, processes 205-245, with further reference to FIG. 4, include and depict processes in which the file-handle for the copy of the file includes an inode number associated with the inode of first independent filesystem.

In one embodiment, processes 205-245, with further reference to FIG. 4, include and depict processes in which data management program 120: modifies the request to include a number of the inode of first independent filesystem that is associated with the file.

In one embodiment, processes 205-245, with further reference to FIG. 4, include and depict processes in which data management program 120: responds to a determination that a change has been requested for the file, propagating the change to the copy of the file based on the file-handle for the copy of the file, wherein the change is applied to the copy of the file by the second independent filesystem.

In one embodiment, processes 205-245, with further reference to FIG. 4, include and depict processes in which data management program 120: responds to a determination that a disaster recovery operation has been initiated for the first independent filesystem, rebuilding one or both of a directory and the file on the first independent filesystem based on the copy of the file and an inode indicated by the file-handle for the copy of the file.

In one embodiment, processes 205-245, with further reference to FIG. 4, include and depict processes in which data management program 120: receives a set of changes for the file; generates an updated version of the file by applying the set of changes to the file, wherein the set of changes modify at least a threshold amount of the file on the first independent filesystem; determines that a cost of propagating the set of changes to the copy of the file exceed a cost of replacing the copy of the file with the updated version of the file; and replaces the copy of the file on the second independent filesystem with the updated version of the file.

In one embodiment, processes 205-245, with further reference to FIG. 4, include and depict processes of data management program 120 executing on computing device 110 and cloud computing device 140.

In one embodiment, in processes 205-245, data management program 120 generates the set of changes by accumulating a plurality of changes that have been made to the file, wherein the changes included in the set of changes have not been propagated to the copy of the file and are determined to have an indication of being low-priority.

In one embodiment, processes 205-245, with further reference to FIG. 4, include and depict processes in which the change is determined to have an indication of being high-priority.

Figure 3:
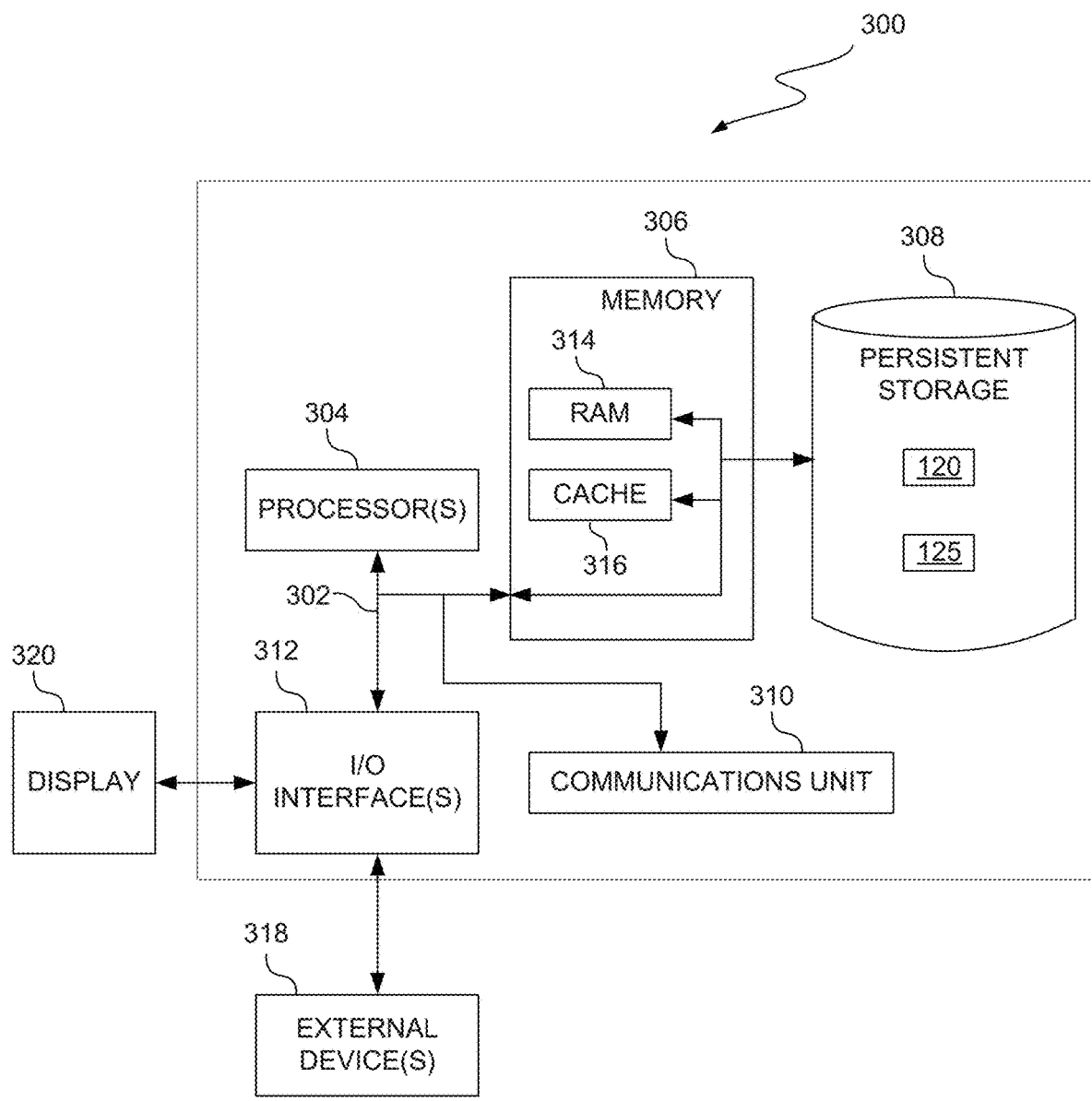
FIG. 3 depicts a block diagram of components of the computing device executing a data management program, in accordance with an exemplary embodiment of the present invention.

FIG. 3 depicts a block diagram, 300, of components of computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Data management program 120 and data 125 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Data management program 120 and data 125 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., data management program 120 and data 125, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

FIG. 4 illustrates a functional block diagram illustrating operational processes of a data management system, generally designated 400, following the environment 100 of FIG. 1, in accordance with an exemplary embodiment of the present invention.

As shown in FIG. 4, in process 1, computing device 110, via data management program 120, executes a create operation for a file, wherein the file is stored as part of database 308. In process 2, computing device 110, via data management program 120, issues an instruction, to cloud computing device 140, to execute a create operation for a copy of the file. In process 3, cloud computing device 140 creates the copy of the file, via execution of processes of data management program 120, in response to receiving the instruction from computing device 110, i.e., cloud computing device 140 performs the needed input/output operations via database 408 to execute the create operation for the copy of the file. In other words, a file in data 125 is used to create a copy of that file, which is stored in cloud files 145 of database 408, which includes a cloud file-system. In process 4, cloud computing device 140 returns, via execution of processes of data management program 120, an indication to computing device 110 indicating that the file was created. In process 5, computing device 110, via data management program 120, generates and stores a set of remote attributes for the file on database 308. In some embodiments, the set of remote attributes includes, but is not limited to, one or a combination of, a filehandle, a remote inode mtime, a ctime, a local file name of the file, and a parent inode number of the file. In some scenarios and embodiments, if the local name is greater that sixty four bits in length, then a foldvalue of the file is stored in place of the local name.

In process 6, computing device 110, via data management program 120, retrieves an extended attribute (EA) for the inode that is associated with the file. More specifically, computing device 110, via data management program 120, generates EA information that is needed to execute a write operation for the file. The EA information is leveraged, via execution of processes of data management program 120, to generate a frame of a complete path for the copy of the file at cloud computing device 140.

In process 7, computing device 110, via data management program 120, generates a write operation for the file based on the frame of the complete path for the copy of the file at cloud computing device 140. In process 8, computing device 110, via data management program 120, generates and issues, to cloud computing device 140, an instruction to perform the write operation on the copy of the file. In process 9, cloud computing device 140 executes the write operation, i.e., performs the needed input/output operations via database 408 to perform the write operation on the copy of the file using the complete path for the file. As such, a change to the file in database 308 is propagated through to the copy of that file included in database 408. In process 10, cloud computing device 140 issues an indication to computing device 110 indicating that the write operation has been completed. In process 11, computing device 110, via data management program 120, updates the remote attributes of the file, i.e., the original file, that are stored in database 308.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
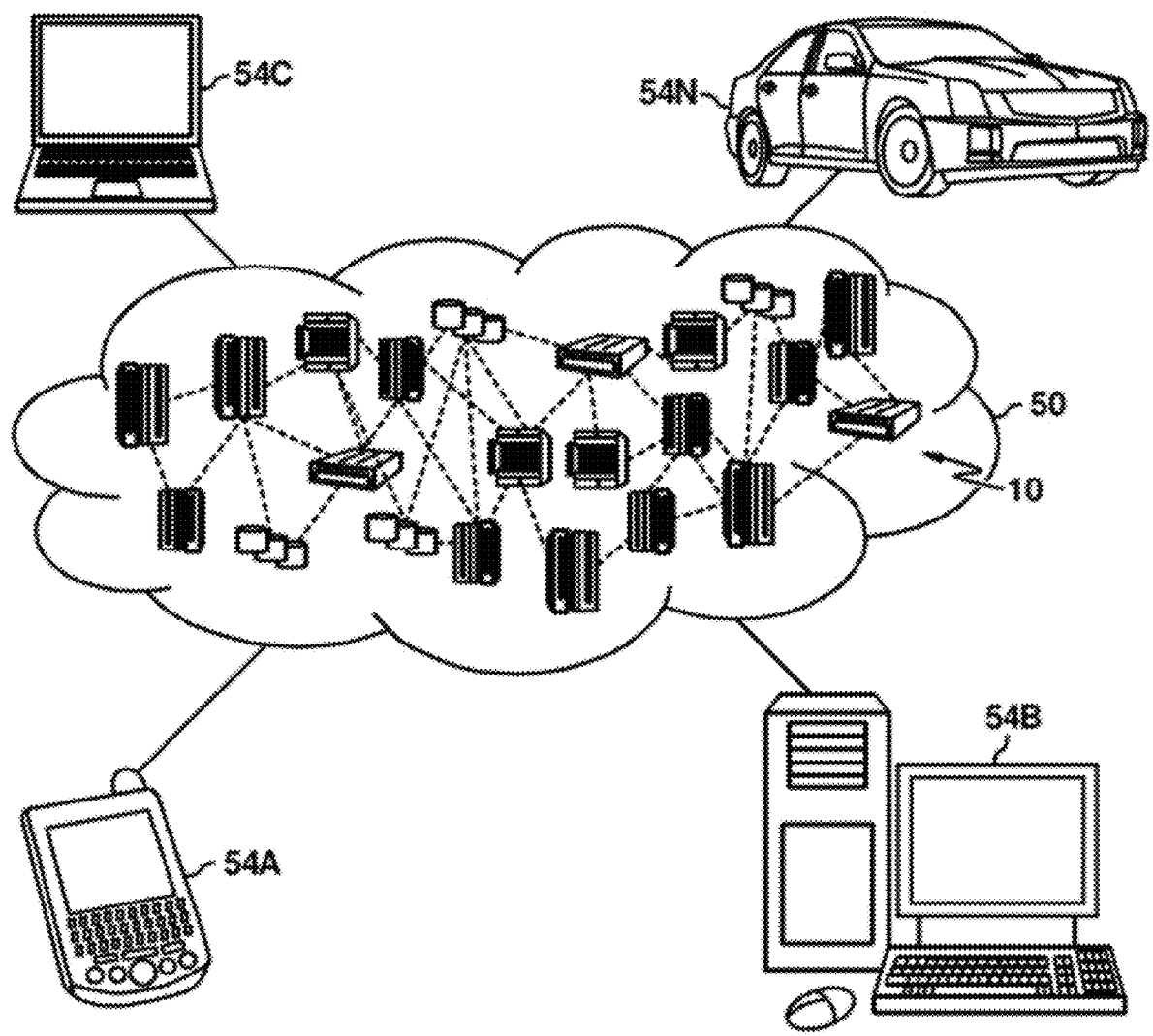
FIG. 5 depicts a cloud computing environment according to an embodiment of the present invention.
Figure 6:
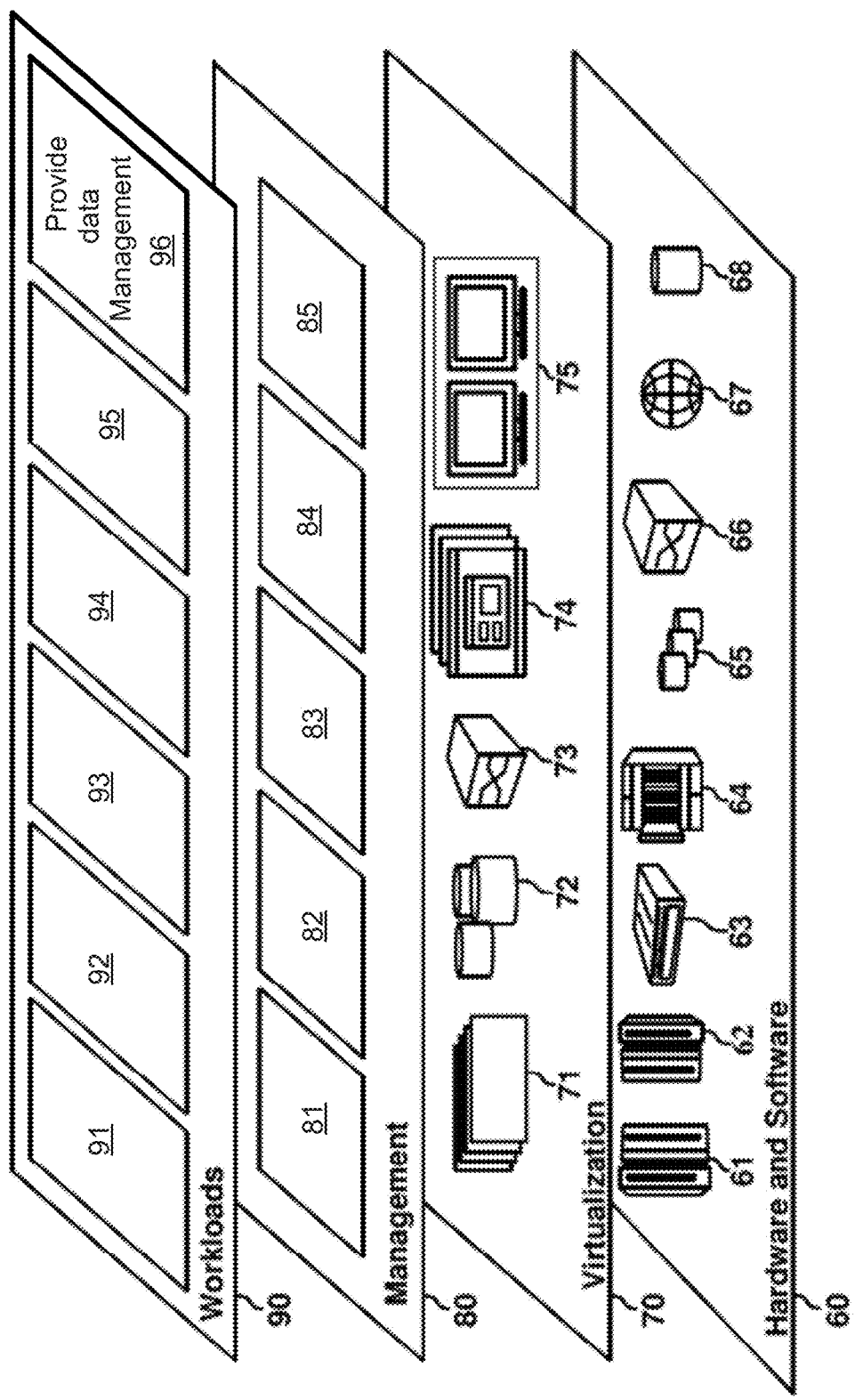
FIG. 6 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing data management 96 following processes of data management program 120 in accordance with an embodiment.

One embodiment of the present invention provides a method of data management using cloud object stores. The method comprising: identifying, by at least one computer processor, a first independent filesystem and a second independent filesystem, wherein the first independent filesystem leverages file-handles and the second independent filesystem operates independently of file-handles; verifying, by the at least one computer processor, whether a size of a remote inode number of the second independent filesystem is at least as large as a combined size of a complete object name and a size of a parent inode number of the first independent filesystem; and storing, by the at least one computer processor, the complete object name and the parent inode number in a file handle that is associated with the remote inode number if a size of the file handle is at least as large as the combined size of the complete object name and the size of a parent inode number.

One embodiment of the present invention provides a method in which the method comprises: determining, by the at least one computer processor, that the complete object name is greater the size of the file handle; and retrieving, by the at least one computer processor, a complete path of objects from a root of a filesystem that is included in a stored reference value.

One embodiment of the present invention provides a method in which the method comprises: performing, by the at least one computer processor, one or both of (i) a follow-up operation and (ii) a modification on an object associated with the complete object name by sending a change or a partial file to a cloud networked computing system to control the amount of data recalled from the cloud networked computing system to an on-premise networked computing system; and tracking, by the at least one computer processor, a cost of data recall/movement between the cloud networked computing system and the on-premise networked computing system, wherein needed data is recalled rather than the complete objects.

One embodiment of the present invention provides a method in which the method comprises: controlling, by the at least one computer processor, an asynchronous delay parameter that is set based on an amount of time required to change data; holding, by the at least one computer processor, onto a queue before migrating a complete object to the cloud networked computing system; and continuously ensuring, by the at least one computer processor, that there are enough data blocks to be replicated or migrated back to the cloud networked computing system.

One embodiment of the present invention provides a method in which the method comprises: utilizing, by the at least one computer processor, a cascading model of caching models, wherein the cascading model includes a hierarchy of storage sites, and wherein at each level of storage site, a first type of data is configurable to be maintained and a second type of data is configurable to be evicted out of a given level of storage site to form a consolidated data store.

One embodiment of the present invention provides a method in which the method comprises: determining that a first independent filesystem and a second independent filesystem have different costs associated with data access relative to a location of a user; determining that the first independent filesystem includes a file; determining that a cost of creating a copy of the file on the second independent filesystem is less than a cost of the user accessing the file on the first independent filesystem; and initiating a creation of the copy of the file on the second independent filesystem.

One embodiment of the present invention provides a method of data management using cloud object stores. The method comprising: verifying, by at least one computer processor, whether a size of a remote inode number is at least as large as a combined size of a complete object name and a size of a parent inode number; and storing, by the at least one computer processor, the complete object name and the parent inode number in a file handle associated with the remote inode number if a size of the file handle is at least as large as the combined size of the complete object name and the size of a parent inode number.

One embodiment of the present invention provides a method in which the method comprises: determining, by the at least one computer processor, that the complete object name is greater the size of the file handle; and retrieving, by the at least one computer processor, a complete path of objects from a root of a filesystem that is included in a stored reference value.

One embodiment of the present invention provides a method in which the method comprises: performing, by the at least one computer processor, one or both of (i) a follow-up operation and (ii) a modification on an object associated with the complete object name by sending a change or a partial file to a cloud networked computing system to control the amount of data recalled from the cloud networked computing system to an on-premise networked computing system; and tracking, by the at least one computer processor, a cost of data recall/movement between the cloud networked computing system and the on-premise networked computing system, wherein needed data is recalled rather than the complete objects.

One embodiment of the present invention provides a method in which the method comprises: controlling, by the at least one computer processor, an asynchronous delay parameter that is set based on an amount of time required to change data; holding, by the at least one computer processor, onto a queue before migrating a complete object to the cloud networked computing system; and continuously ensuring, by the at least one computer processor, that there are enough data blocks to be replicated or migrated back to the cloud networked computing system.

One embodiment of the present invention provides a method in which the method comprises: utilizing, by the at least one computer processor, a cascading model of caching models, wherein the cascading model includes a hierarchy of storage sites, and wherein at each level of storage site, a first type of data is configurable to be maintained and a second type of data is configurable to be evicted out of a given level of storage site to form a consolidated data store.

One embodiment of the present invention provides a method in which the method comprises: forming a subset of data (an edge cache) that is logically closer to the users who are interested in the subset of the data. One embodiment of the present invention provides a method in which the method comprises: on-premises locations pulling data of interest (or vice versa—the cloud computing system pulling data of interest from the on-premises systems) on demand; read requests are captured from one or more applications; determining whether a given object of interest included in the read requests is present at the edge cache already, and, if not, fetching the object from a remote site (e.g., the cloud computing system).

One embodiment of the present invention provides a method in which the method comprises: storing an object path of an object on a remote site to an on-premises site, wherein the object path is stored as part of an extended attribute of a counterpart to the object that is included as part of the on-premises site; and identifying the counterpart to the object at the remote site based on the extended attribute of the counterpart to the object.

One embodiment of the present invention provides a method in which the method comprises: predicting that a subset of objects from a cloud based computing system will be accessed by a user; fetching the subset of objects from a cloud based computing system; and storing the subset as part of an on-premises computing system that is excluded from an on-demand data retrieval model that includes the cloud based computing system.

One embodiment of the present invention provides a method in which the method comprises: collecting changes to objects for a predefined interval of time that is dictated by an asynchronous delay in replication, such that (i) an amount of back and forth calls between an premises computing system and a cloud based computing system is reduced and (ii) an actual amount of data transfer that is required is reduced in a scenario in which a given object is determined to be flagged for, or is, removed before the object data can be pushed to the cloud based computing system.

One embodiment of the present invention provides a method in which the method comprises: providing an on-demand pull of an object from a cloud based computing system to an on-premises computing system by: creating an on-premises file-set/file-system that points to an existing cloud system that includes a set of consolidated data that includes the object; determining that a user has requested access the object via on the on-premises computing system; pulling the object on demand from the cloud based computing system; and storing, at least temporarily, a copy of the object as part of the on-premises computing system.

One embodiment of the present invention provides a method in which the method comprises: generating a consolidated list of objects on an on-premises computing system that are predicted to be required by a cloud based computing system; pulling all of the objects in the consolidated list from the on-premises computing system; and storing all of the objects in the consolidated list as part of the cloud based computing system.

One embodiment of the present invention provides a method in which the method comprises: determining that a data storage of an on-premises computing system has been filled to at least a threshold; identifying, based on object attributes, one or more objects included in the on-premises computing system that meet the qualifications for eviction from the on-premises computing system; verifying that a copy of the one or more objects exists as part of a cloud based computing system; and evicting the one or more objects from the data storage. In some such embodiments, the eviction of the one or more objects from the on-premises computing system is governed by limits that are set per user/file-set/filesystem such that when a limit is reached, then the eviction of the one or more objects is initiated.

One embodiment of the present invention provides a method in which the method comprises: processing a request that dictates that a set of objects included as part of an on-premises computing system are to be pushed to a cloud based computing system; and establishing a set of new access pathways for the set of objects based on respective locations of the set of objects on the cloud based computing system.

One embodiment of the present invention provides a method in which the method comprises: determining that a fail-over has occurred on an on-premises computing system; determining that a request was received for access to an object that is stored on the on-premises computing system; and redirecting the request such that a copy of the object on a cloud based computing system is used to serve the request. In one such embodiment, the copy of the object is used to serve such requests until it is determined that the on-premises computing system has recovered from the fail-over. In one such embodiment, the copy of the object is used, at least in part, by the on-premises computing system to recover from the fail-over. In one such embodiment, the copy of the object is updated, via one or more requests, during the failover such that the on-premises computing system includes an updated version of the object when the on-premises computing system is brought back on-line following fail-over recovery.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that certain term(s) used herein may be subject to trademark rights in various jurisdictions throughout the world and are used here only in reference to the products or services properly denominated by the marks to the extent that such trademark rights may exist.

It is apparent that there has been provided approaches for distributed data management. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method, the method comprising:
   identifying, by at least one computer processor, (I) a first independent filesystem that (i) includes a file and (ii) uses file-handles to locate files and (II) a second independent filesystem that (i) operates independently of file-handles, associated with the first independent filesystem, when locating files and (ii) includes a copy of the file;
   generating, by the at least one computer processor, a file-handle for the copy of the file on an index of first independent filesystem based on a full-path for the copy of the file on the second independent filesystem; and
   replicating, by the at least one computer processor, one or more data blocks between the first independent filesystem and the second independent filesystem based, at least in part, on the full-path.

2. The method of claim 1, the method comprising:
   determining, by the at least one computer processor, that a request has been made for the creation of the copy of the file on the second independent filesystem; and
   responsive to a determination that the copy of the file was created on the second independent filesystem, generating, by the at least one computer processor, the full-path for the copy of the file based, at least in part, on a set of characteristics of the second independent filesystem.

3. The method of claim 1, the method comprising:
   storing, by the at least one computer processor, the full-path for the copy of the file as part of a space of the file-handle, wherein the full-path for the copy of the file is determined based on a Filesystem root of the second independent filesystem.

4. The method of claim 1, wherein the second independent filesystem generates a set of file-handles for one or both of files and directories, and wherein file-handles included in the set of file-handles are unique and are generated based on an inode number, a generation number, and a filesystem identifier (FSID) of the exports.

5. The method of claim 1, the method comprising:
   determining, by the at least one computer processor, that an operation on the file has been requested;
   executing, by the at least one computer processor, the operation on the file;
   retrieving, by the at least one computer processor, the file-handle for the copy of the file; and
   executing, by the at least one computer processor, the operation on the copy of the file based on the file-handle for the copy of the file.

6. The method of claim 1, the method comprising:
   generating, by the at least one computer processor, the full-path for the copy of the file based on a root of a file-set of the second independent filesystem; and
   associating, by the at least one computer processor, the full-path with the copy of the file.

7. The method of claim 1, the method comprising:
replicating, by the at least one computer processor, the one or more data blocks between the first independent filesystem and the second independent filesystem by either creating or modifying a data object based, at least in part, on a complete name for the data object that is included in the root of a respective filesystem.

8. The method of claim 1, wherein generating a file-handle for the copy of the file comprises:
determining, by the at least one computer processor, a number of bits needed to store a name associated with the copy of the file; and
responsive to a determination that the number of bits exceeds a number of bits of the file-handle, populating, by the at least one computer processor, a name in the file-handle based on a fold-value associated with the copy of the file.

9. The method of claim 1, wherein generating a file-handle for the copy of the file comprises:
determining, by the at least one computer processor, a number of bits needed to store a name associated with the copy of the file; and
responsive to a determination that the number of bits is less than or equal to a number of bits of the file-handle, populating, by the at least one computer processor, the name in the file-handle based on the name associated with the copy of the file.

10. The method of claim 1, wherein the file-handle for the copy of the file includes an inode number associated with the inode of first independent filesystem.

11. The method of claim 2, the method comprising:
modifying, by the at least one computer processor, the request to include a number of the inode of first independent filesystem that is associated with the file.

12. The method of claim 1, the method comprising:
responsive to a determination that a change has been requested for the file, propagating, by the at least one computer processor, the change to the copy of the file based on the file-handle for the copy of the file, wherein the change is applied to the copy of the file by the second independent filesystem.

13. The method of claim 1, the method comprising:
responsive to a determination that a disaster recovery operation has been initiated for the first independent filesystem, rebuilding, by the at least one computer processor, one or both of a directory and the file on the first independent filesystem based on the copy of the file and an inode indicated by the file-handle for the copy of the file.

14. The method of claim 1, the method comprising:
receiving, by the at least one computer processor, a set of changes for the file;
generating, by the at least one computer processor, an updated version of the file by applying the set of changes to the file, wherein the set of changes modify at least a threshold amount of the file on the first independent filesystem;
determining, by the at least one computer processor, that a cost of propagating the set of changes to the copy of the file exceed a cost of replacing the copy of the file with the updated version of the file; and
replacing, by the at least one computer processor, the copy of the file on the second independent filesystem with the updated version of the file.

15. The method of claim 14, the method comprising:
generating, by the at least one computer processor, the set of changes by accumulating a plurality of changes that have been made to the file, wherein the changes included in the set of changes have not been propagated to the copy of the file and are determined to have an indication of being low-priority.

16. The method of claim 12, wherein the change is determined to have an indication of being high-priority.

17. A computer program product, the computer program product comprising a computer readable storage medium having program instructions embodied therewith, wherein the computer readable storage medium is not a transitory signal per se, the program instructions executable by a device to cause the device to perform a method comprising:
identifying, by at least one computer processor, (I) a first independent filesystem that (i) includes a file and (ii) uses file-handles to locate files and (II) a second independent filesystem that (i) operates independently of operates independently of file-handles, associated with the first independent filesystem, when locating files and (ii) includes a copy of the file;
generating a file-handle for the copy of the file on an index node of first independent filesystem based on a full-path for the copy of the file on the second independent filesystem; and
replicating one or more data blocks between the first independent filesystem and the second independent filesystem based, at least in part, on the full-path.

18. The computer program product of claim 17, the method comprising:
determining that a request has been made for the creation of the copy of the file on the second independent filesystem; and
responsive to a determination that the copy of the file was created on the second independent filesystem, generating the full-path for the copy of the file based, at least in part, on a set of characteristics of the second independent filesystem.

19. The computer program product of claim 17, the method comprising:
storing the full-path for the copy of the file as part of a space of the file-handle, wherein the full-path for the copy of the file is determined based on a Filesystem root of the second independent filesystem.

20. A computer system, the computer system comprising:
one or more computer processors;
at least one computer readable storage medium that is not a transitory signal per se; and
program instructions stored on the at least one computer readable storage medium, the program instructions being executable by at least one computer processor of the one or more computer processors to cause the at least one computer processor to perform a method comprising:
identifying, by at least one computer processor, (I) a first independent filesystem that (i) includes a file and (ii) uses file-handles to locate files and (II) a second independent filesystem that (i) operates independently of file-handles, associated with the first independent filesystem, when locating files and (ii) includes a copy of the file;
generating a file-handle for the copy of the file on an index node of first independent filesystem based on a full-path for the copy of the file on the second independent filesystem; and
replicating one or more data blocks between the first independent filesystem and the second independent filesystem based, at least in part, on the full-path.

* * * * *